United States Patent [19]

Cornelissen

[11] Patent Number: 4,541,724

[45] Date of Patent: Sep. 17, 1985

[54] APPARATUS FOR COUNTER-CURRENT CONTACT OF FLUIDS

[75] Inventor: Anton E. Cornelissen, Amsterdam, Netherlands

[73] Assignee: Shell Oil Company, Houston, Tex.

[21] Appl. No.: 630,915

[22] Filed: Jul. 13, 1984

[30] Foreign Application Priority Data

Jul. 29, 1983 [GB] United Kingdom ............... 8320549

[51] Int. Cl.[4] .............................................. B01F 7/16
[52] U.S. Cl. .................................. 366/290; 366/293; 366/302
[58] Field of Search .................................. 366/64–67, 366/91, 96, 97, 241, 279, 290, 302, 292, 306, 293, 307, 325

[56] References Cited

U.S. PATENT DOCUMENTS 2,665,196  1/1954  Poffenberger ................. 366/290 X Primary Examiner—Timothy F. Simone

[57] ABSTRACT

Apparatus for counter-current contact of at least partially immiscible fluids having different densities, which apparatus comprises a vertical vessel enclosing a plurality of superposed stirred compartments separated from one another by perforated separating walls. To increase the hold-up of dispersed fluid phase in the compartments, part of the perforations in the walls are provided with deflecting elements preventing flow of dispersed fluid through said perforations while substantially not hampering the flow of fluid being in the continuous phase.

6 Claims, 3 Drawing Figures

APPARATUS FOR COUNTER-CURRENT CONTACT OF FLUIDS

BACKGROUND OF THE INVENTION

The present invention relates to an apparatus for counter-current contact between two at least partially immiscible fluids with different specific gravities.

More in particular, the invention relates to such an apparatus, suitable for example for the extraction of one or more components from a first fluid phase by a second fluid phase, which apparatus has a plurality of superposed mixing compartments with rotatable agitator means therein and separated from each other by perforated separating walls. In such an apparatus the specifically heavier fluid phase is fed to, and the lighter fluid phase is discharged from the uppermost mixing compartment and the lighter fluid phase if fed to and the heavier liquid phase is discharged from the lowermost mixing compartment. Such an apparatus may be considered as a series of consecutive mixers, through which the fluid phases are counter-currently passed. In order to suppress back-mixing of fluid to a preceding compartment perforated walls are installed between the compartments.

An example of the above type of fluid/fluid contact apparatus is known from British patent specification No. 1,223,902.

In fluid contact systems it is generally recommended to have the fluid phase with the larger volumetric flowrate as the dispersed phase, since this results in a high dispersed phase hold-up and therefore in a larger interfacial area, thus larger separating efficiency as compared to systems in which the fluid with the smaller volumetric flowrate forms the dispersed phase.

However, if the ratio of the respective volumetric flowrates is rather large, for example 4:1 or even more, stable operation with the fluid having the larger volumetric flowrate as dispersed phase will only be possible at relatively low loads, and therefore low hold-up of dispersed phase. At higher throughputs the hold-up of dispersed phase does increase, but may be accompanied with phase inversion, which should be avoided in commercial operation of fluid contact systems. If phase inversion occurs, coalescence and settling of dispersed phase have to take place at the other end of the contact apparatus than designed, which will result in a completely unsatisfactory unstable operation.

If the ratio of the flowrates is large, stable operation of the contact apparatus requires to have the fluid with the smaller volumetric flowrate as the dispersed phase but, as stated above, this will result in a relatively low hold-up of dispersed phase and hence in a relatively small interfacial area and consequently a relatively poor contact efficiency. One solution for this problem might be to carry out the contact operation in so called mixer-settlers, and to recirculate dispersed phase from the settler to the mixer. This solution however is for practical reasons unattractive if a large number, say three or more, of socalled theoretical stages is required.

The object of the present invention is to provide an apparatus for counter-current contact of fluids with a high efficiency, which apparatus is particularly suitable for contacting fluids with a large ratio of their respective volumetric flowrates.

SUMMARY OF THE INVENTION

The apparatus for counter-current contact of at least partially immiscible fluids having different densities thereto comprises according to the invention a normally vertically extending vessel enclosing a plurality of superposed mixing compartments, each containing a rotatable agitator means and being separated from each other by separating walls with perforations for the passage fluid. The separating walls are each provided with deflecting elements arranged to cooperate with a part of the perforations. The deflecting elements are arranged for substantially preventing the flow in one direction of a fluid being in the dispersed phase through the perforations with which they cooperate without substantially hampering such a flow in the opposite direction of a fluid being in the continuous phase.

DESCRIPTION OF THE INVENTION

Figure 1:
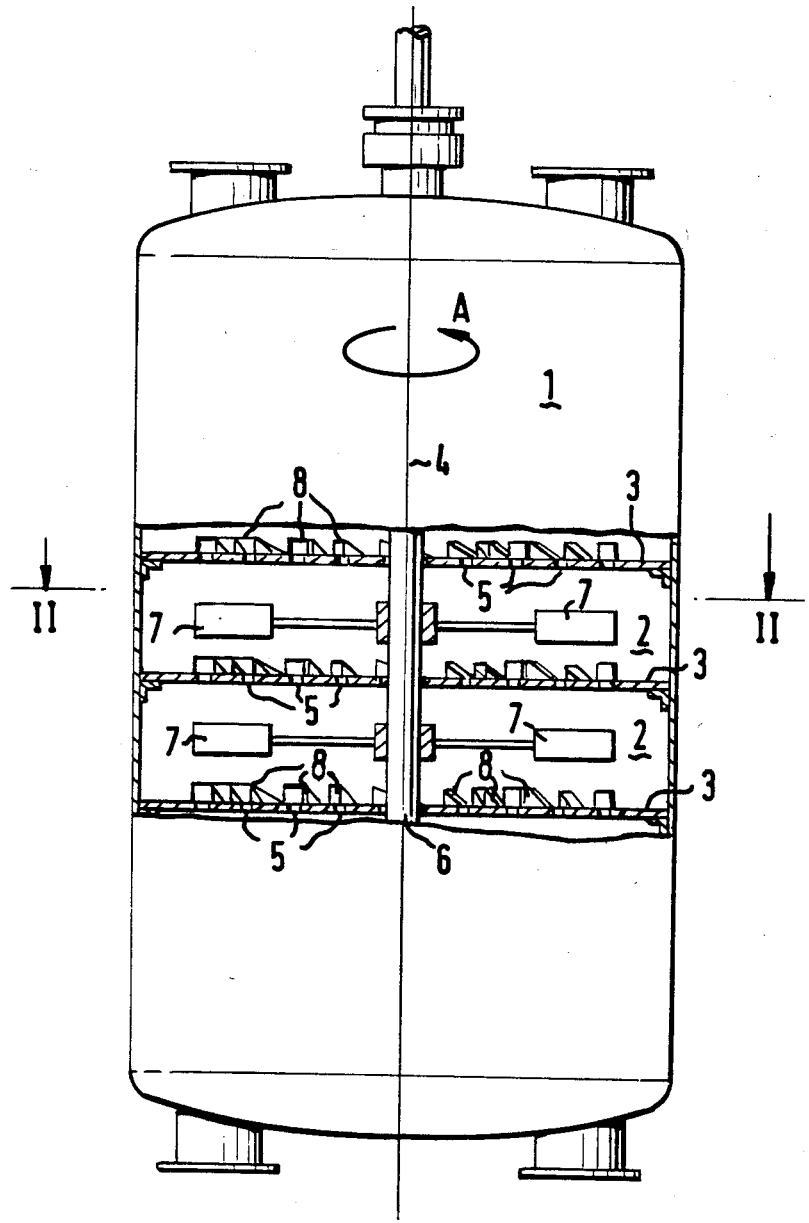
FIG. 1 shows a longitudinal section of two mixing compartments of an apparatus according to the invention for the counter current contact of fluids.
Figure 2:
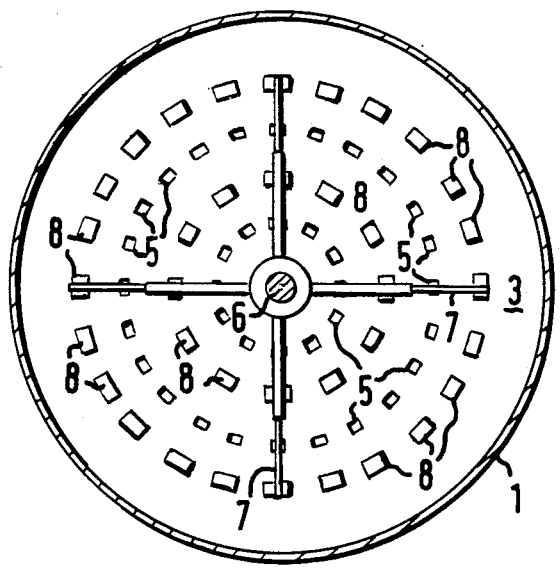
FIG. 2 is a view in section taken along line II—II of FIG. 1.
Figure 3:
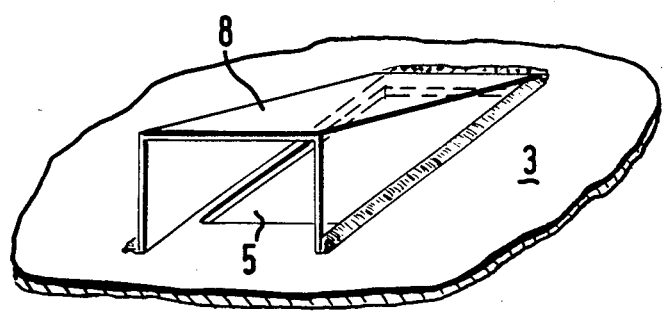
FIG. 3 shows one form of deflecting elements according to the invention.

The above apparatus according to the invention is particularly suitable for contacting fluids with a relatively high ratio of their respective volumetric flowrates. Advantageously, the fluid with the lower flowrate can be kept as the dispersed phase, which is the more stable situation. This is because the interfacial area between the fluid phases is enlarged by the increased hold-up of the dispersed phase in the mixing compartments, owing to the presence of the deflecting elements over part of the perforations in the separating walls between the mixing compartments. As already mentioned in the above an increase of the interfacial area between the fluid phases will result in a higher efficiency of the fluid/fluid contact in the proposed apparatus as compared to the efficiency attainable in contact columns up to now available.

For the supply and discharge of fluids an inlet port for a first fluid and an outlet port for second fluid are situated above the mixing compartments, and an inlet port for the second fluid and a lower outlet port for the second fluid are situated below the bottom mixing compartment.

For operation of the apparatus, the fluid phase with the larger density is introduced over the top of the vessel, while the lighter fluid phase is fed via the lower part of the vessel. If the denser fluid phase is the dispersed one and flows in downward direction through the vessel deflecting elements should be arranged on the upper sides of the separating walls, thus preventing drops of dispersed phase to pass through part of the perforations in the separating walls. The presence of the deflecting elements causes an increased hold-up of the dispersed fluid phase in the mixing compartments. If, however, the heavier fluid forms the continuous phase and the lighter fluid flows in upward direction as the dispersed phase through the vessel, the deflecting elements should be arranged on the lower sides of the separating walls between the mixing compartments.

The percentage of the perforations in the separating walls which should be provided with deflecting elements depends upon the ratio of the volumetric flowrates of the fluids to be contacted with one another. If for instance the ratio of dispersed phase to continous phase is 1 to 4, and if three out of four perforations are provided with deflecting elements, the chances for the dispersed phase droplets to pass to a next compartment are reduced to 25 percent. This is the same as for a mixer/settler with a threefold recirculation of dispersed phase. In both cases the fluid in the mixing zone will behave as if the phase ratio of the fluid phases were 1 to 1.

The deflecting elements may have any suitable shape. In order to obviate disturbance of the flow patterns in the mixing compartments, it is however preferred to use deflecting elements which are at one end secured to the relevant separating wall and which are inclined with respect to the plane of the relevant separating wall. The inclination of the elements should preferably be slanting away from the separating wall in the direction of rotation of the agitator means. It is preferred to have the deflecting elements so arranged over the separating wall perforations that the continuous phase passing through the covered perforations enters into a mixing compartment substantially tangentially to the direction of rotation in said compartment. The opening for the passage of continuous flow left between a deflecting element and the accompanying wall perforation(s) should preferably have an area at least as large as the area of the separating wall perforation(s). To minimize the space occupied by deflecting elements, which space is not available for fluid/fluid contact, each deflecting element preferably cooperates with a single opening in a separating wall.

The apparatus, shown in FIG. 1, consists of a vertically extending vessel 1 enclosing a plurality of superposed mixing compartments 2, only two of which are shown. The mixing compartments 2 are separated from each other by separating walls 3 extending substantially perpendicularly to the longitudinal axis 4 of the vessel 1. The separating walls 3 are each provided with a plurality of perforations 5 substantially uniformly distributed over the wall area. Typical dimensions for the perforations are chosen in the range from 1 to 2 inch. Although the perforations 5 as shown in the drawings, have a rectangular shape, any other shape, such as a circular or elliptical one, may be chosen for these perforations.

A rotatable shaft 6 substantially centrally extends over the entire length of the vessel 1. One end of the shaft extends through a sealing in the top or bottom of the vessel for connection with a driving means, not shown in the drawings. Each mixing compartment of the apparatus as shown is provided with an agitator 7 mounted on the rotatable shaft 6. The agitators 7 may consist of rotatable discs or may be of any other type, normally applied for intensive mixing of fluid phases. The agitators preferably have no pitch so as to impart only a horizontal rotation to the fluid media in the mixing compartments.

The separating walls 3 are further provided with a plurality of inclined caps 8 arranged above part of the perforations 5 and suitably secured to said walls 3 by means of, for example welds. The caps 8 are arranged in the direction of rotation of the shaft 6, as indicated in the FIG. 1 with an arrow A. The caps 8, being open at one end, are so positioned with respect to the rotatable shaft 6, that fluid is substantially prevented from passing downward through the capped openings during operation of the shown system.

The operation of the apparatus described in the above and shown in the Figures will now be discussed in more detail.

In its shown position the apparatus is intended to be used for dispersing a heavier fluid phase in a continuous lighter fluid phase, wherein the fluid phases are at least partly immiscible. Firstly the continuous phase is introduced into the vessel via the bottom part thereof to completely fill the vessel interior. The agitators are subsequently put in operation, and the heavier phase is fed to the upper part of the vessel and immediately flows under the influence of its greater density in downward direction into the uppermost mixing compartment 2. The heavier fluid moving downwardly encounters the agitator 7 and is finely dispersed in the continuous fluid phase by the rotary movement of said agitator. The density difference between the two fluid phases induces counter-current flow of the fluids through the mixing compartments 2. The lighter continuous fluid phase will be caused to flow upwardly via the perforations 5 in the separating walls 3 to a next upper mixing compartment, while the heavier dispersed fluid phase passes through the separating walls to a next lower mixing compartment.

The presence of the deflecting elements over part of the separating wall perforations 5 tends to prevent the dispersed phase from leaving a mixing compartment 2 via the so covered perforations. The deflecting elements, formed by the caps 8, are so arranged according to the invention that upward flow of continuous phase through the capped perforations 5 is substantially not hampered. Owing to the presence of the caps 8 the hold-up of the dispersed fluid phase is increased as compared to the hold-up which would occur in a similar apparatus not provided with deflecting elements, without having to operate close to flooding conditions. The increased hold up of the dispersed phase results in a larger interfacial area of the two fluid phases, and thus provides an increased separating efficiency of the apparatus as compared to known columns not provided with deflecting elements.

If the heavier fluid phase is selected as the dispersed phase, the entire system of inlets, outlets and mixing compartments with deflecting elements has to be constructed in the converse manner. The deflecting elements will then be arranged at the lower sides of the separating walls.

The fluid phases brought into intimate contact in the vessel may comprise liquid, gas or vapor or liquid solutions or dispersions of solid material.

It should be noted that the contact apparatus as shown is further provided with at least one settling zone (not shown). Settling zones are known per se, for collecting the dispersed fluid phase prior to withdrawal thereof after the fluid contact has been completed. It will be understood that if the dispersed fluid phase is the heavier one the settling zone is to be arranged in the bottom part of the vessel. When the lighter phase is dispersed, in which case the vessel is constructed upside down, the settling zone for collecting the dispersed phase is located in the top part of the vessel.

Intermediate demixing of the fluid phases may be accomplished by providing special settling zones, known per se, in between adjacent mixing zones. After the intensive mixing in a mixng compartment or a group of mixing compartments the fluid phases are permitted to demix and separate from one another in these settling zones, on the basis of their differing density, and after the separation in the settling zones the fluid phases are caused to flow to a next mixing compartment. The settling zones can take different forms. A suitable embodiment of a settling zone in a vertical fluid/fluid contact device is for example described in British patent publication No. 2,054,401.

Finally, it is remarked that the mixing compartments may each be provided with more than one agitator element without departing from the present invention. Especially in larger vessels with large diameters such an arrangement may be advantageously applied for maintaining the contact efficiency at an acceptable level. When the mixing compartments are each provided with more than one agitator means disposed adjacent to each other, the deflecting elements should preferably be groupwise arranged corresponding with the position of the agitator means and the direction of rotation of the various agitators.

What is claimed is:

1. In an apparatus for counter-current contacting of at least partially immiscible fluids having different densities, which apparatus comprises a normally vertically extending vessel enclosing a plurality of superposed mixing compartments with rotatable agitator means and being separated from each other by separating walls with perforations for the passage of fluid, the improvement comprising:

said mixing compartments being positioned adjacent to each other and separated by walls pierced by perforations which are substantially uniformly distributed over their wall areas;

deflecting elements arranged to cooperate with a proportion of said perforations which proportion is correlated with the ratio of the volumetric flow rates of the fluids to be treated; and said deflecting elements being positioned and oriented with respect to the direction of flow of the dispersed fluids and the direction of rotation of said agitator so that they tend to prevent flow of the dispersed fluid through the perforations with which they cooperate, so that the apparatus is particularly suitable for contacting fluids with a large ratio of their respective flow rates and is capable of providing stable operation with the fluid having the smaller volumetric flow rate as the dispersed phase.

2. Apparatus as claimed in claim 1, wherein the deflecting elements are inclined with respect to the plane of the accompanying separating wall, the inclination being in the direction of rotation of the agitator means.

3. Apparatus as claimed in claim 1, wherein the deflecting elements provide openings for the supply of fluid in the continuous phase in a direction substantially tangentially to the direction of rotation of the agitator means.

4. Apparatus as claimed in claim 1, wgerein the deflecting elements provide openings for the passage of fluid in the continuous phase which openings are substantially at least as large as the adjoining perforations in the separating walls.

5. Apparatus as claimed in claim 1, wherein the deflecting elements each cooperate with a single perforation in the accompanying separating wall.

6. Apparatus as claimed in claim 1, wherein the deflecting elements are in the form of caps secured to the relevant separating walls.

* * * * *